United States Patent [19]

Millet

[11] Patent Number: 4,730,651
[45] Date of Patent: Mar. 15, 1988

[54] DEVICE AND PROCESS FOR TAPPING TANKS, IN PARTICULAR BREWERY TANKS

[75] Inventor: Pierre Millet, Vandoeuvre, France

[73] Assignee: Institut Francais des Boissons de la Brasserie Malterie, Nancy, France

[21] Appl. No.: 868,722

[22] Filed: May 30, 1986

[30] Foreign Application Priority Data

Jun. 3, 1985 [FR] France ............... 85 08435

[51] Int. Cl.⁴ .............................................. B67C 3/00
[52] U.S. Cl. .................................. 141/236; 137/625.41
[58] Field of Search ........................ 141/234, 236; 137/625.41, 625.18

[56] References Cited

U.S. PATENT DOCUMENTS

| 1,786,858 | 12/1930 | Merrell et al. | 141/236 X |
| 2,034,281 | 3/1936 | Buchholz | 137/625.41 X |
| 2,448,933 | 9/1948 | Thomas | 137/635 |
| 2,984,388 | 5/1961 | Scarr et al. | 137/625.41 X |
| 3,186,434 | 6/1965 | Hrdina | 137/625.18 X |
| 3,642,022 | 2/1972 | Kirby | 137/625.18 X |
| 3,752,167 | 8/1973 | Makabe | 137/625.41 |
| 4,396,036 | 8/1983 | Horikawa et al. | 137/625.41 |

FOREIGN PATENT DOCUMENTS 2077759 12/1981 United Kingdom .

Primary Examiner—Mark J. Thronson
Attorney, Agent, or Firm—Sandler & Greenblum

[57] ABSTRACT

A tapping device for large capacity recipients of a brewing installation for the storage and/or treatment of alimentary or other liquids, in particular beer. The installation includes a network of pipes connecting the recipients with one another and with appliances supplying the functions of service and to use the recipients.

The tapping device according to the invention has positioning members for the extremities of the connecting pipes which cooperate with U-shaped members for connecting an orifice of a pipe with an orifice of another pipe.

18 Claims, 9 Drawing Figures

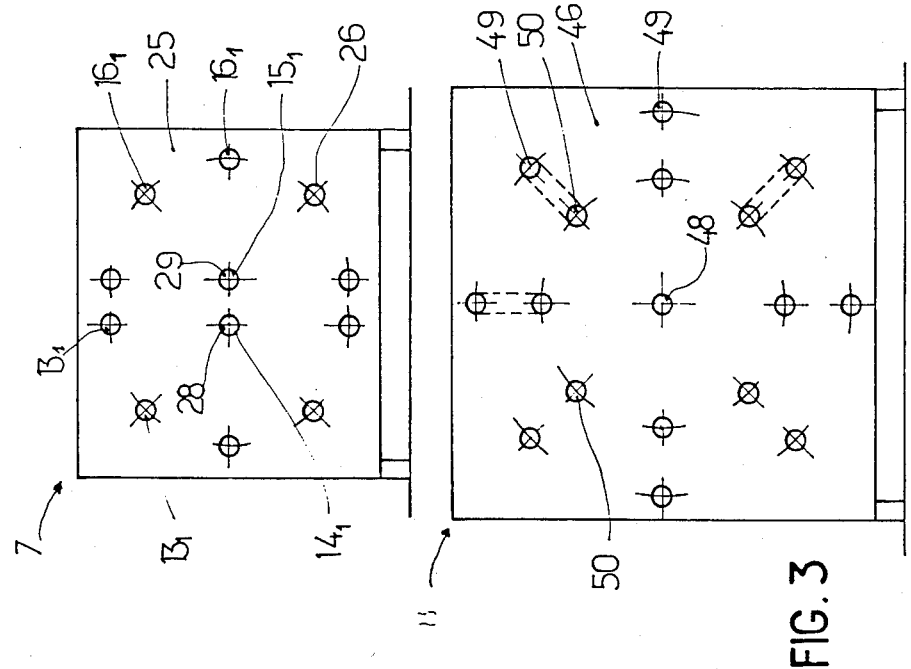
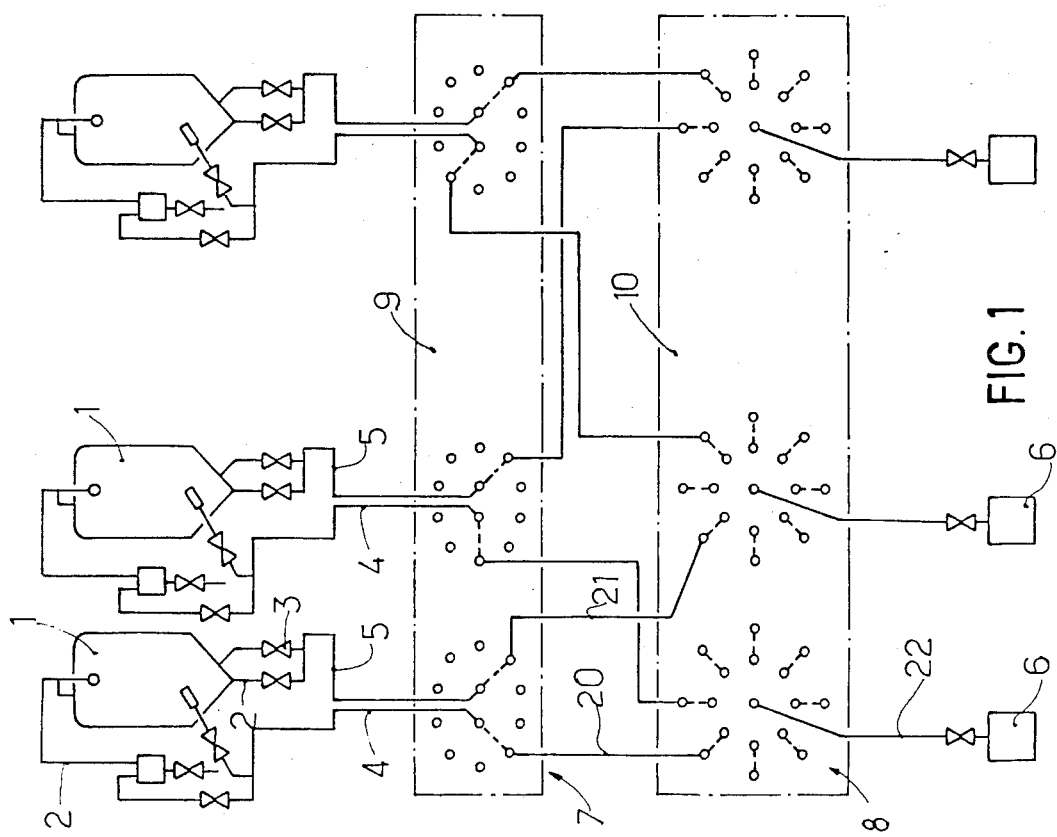

4,730,651

DEVICE AND PROCESS FOR TAPPING TANKS, IN PARTICULAR BREWERY TANKS

BACKGROUND OF THE INVENTION

This invention concerns a tapping device for large capacity recipients of a brewing installation for the storage and/or treatment of alimentary liquids, in particular beer, this installation also comprising a network of connecting pipes between the recipients and the appliances providing the functions of the recipients.

Two technical principles are known for serving large capacity recipients generally grouped in a cellar and used mainly in the food industry for the manufacture, treatment or storage of alimentary liquids such as beer, milk or others.

These large capacity recipients have to be connected during their use to various stations ensuring functions such as washing, filling or emptying of the recipients, connecting them to filtering devices or to devices for putting under pressure or escape of gases, etc.

The first technique used for the connection between the recipients of a cellar and the stations ensuring the functions enumerated above consists of using an operator who makes the tappings manually; this involves on the one hand, risks of incorrect tapping and, on the other hand, difficulties in manipulation due to the often great length and diameter of the flexible pipes to be connected.

A more developed technique consists of interlocking these large capacity recipients with a system of more or less sophisticated automatic valves allowing a network to be created for distribution of supply and total or partial emptying of the recipients. This grid of automatic valves, intended to replace the operator, is then controlled from a console, which is considerably easier to operate but does not eliminate the risks of incorrect switching which can lead to catastrophic effects on the contents of the recipients. Moreover, if the possibility of intermixing of different fluids, for example, beer before and after fermentation.

Moreover, the price of such a grid of automatic valves is another major disadvantage connected with this technique. In fact, a complete network of valves necessitates the use of a large number of valves amounting to as many as twenty valves per recipient. And each of these automatic valves comprises a leak detector which adds to the complexity, and makes the current unit price to some forty thousand francs as soon as pipe diameter approaches to about 150 mm, which is common in breweries where a great number of pipes with a large diameter need to be connected. Therefore, there is a need for a reliable automatic tapping device which costs significantly less than the known devices. Moreover, the device must not permit leaks nor intermixing between the functions and the services to preserve the contents in the recipients.

SUMMARY OF THE INVENTION

Thus one of the aims of this invention is to propose an automatic tapping device to be connected between the recipients of a cellar, particularly in a brewery, and the services of these recipients.

The invention concerns a tapping device for large capacity recipients of an installation for the storage and/or treatment of alimentary or other liquids, in particular beer. The installation comprises a network of connecting pipes between the recipients and appliances ensuring the functions of service and to use the recipients. The tapping device is characterized in that it comprises means of positioning the extremities of the connecting pipes, cooperating with means of automatically connecting an orifice of a pipe with an orifice of another pipe.

BRIEF DESCRIPTION OF THE DRAWINGS

The invention will be clearly understood by referring to the following description given as a non-limitative example and the attached drawings in which:

FIG. 1 is a schematic view of a cellar using large capacity recipients and automatic tapping devices according to the invention.

FIG. 2 is a sectional view taken along a plane 1—1 of the automatic tapping device of FIG. 4.

FIG. 3 is a view taken along a plane II—II of the automatic tapping device of FIG. 5.

DETAILED DESCRIPTION OF THE INVENTION

Figure 4:
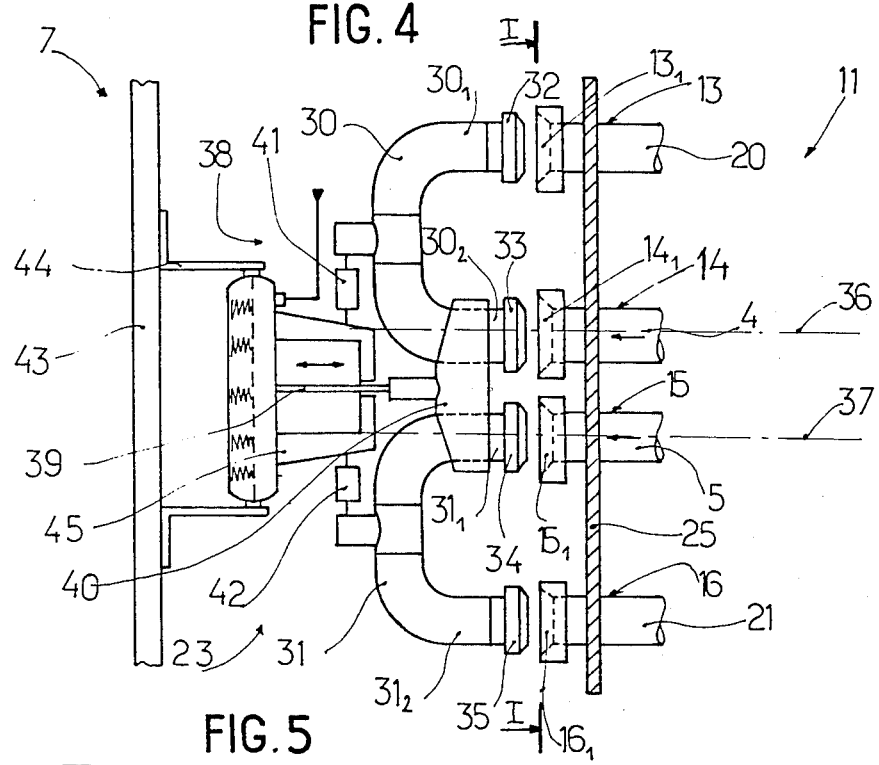
FIG. 4 is a plane view partially in section of an automatic tapping device according to the invention.

As disclosed in FIG. 1, a cellar, in particular a brewery cellar, comprises essentially a predetermined number of large capacity recipients 1 allowing alimentary liquids such as beer to be stored, or intermediary liquids appearing during the fermentation or during another stage of manufacture or storage.

Each recipient 1 comprises a certain number of pipes 2 for supplying or evacuating liquids or gases which can, for example, be pipes intended for the services of the recipients (putting under pressure, or escape of gases, arrival of washing liquids, etc.) or pipes intended for the use functions of the recipients, i.e., the supply or evacuation of products and liquids used for the manufacture of the beer.

So that the different stages of manufacture and/or storage can take place over time without interfering with one another, the recipients 1 are provided with a certain number of valves 3, some of which are open and others are closed according to the stage, in course.

Moreover, during a particular mode of operation, as shown in FIG. 1, the pipes intended for the services are grouped in a single pipe 4 which should permit branching to stations supplying the services.

In the same manner, the pipes for conveying the products necessary for making the beer are grouped in one single pipe 5, intended for connection to the true functions of the recipients 1 so as to ensure the manufacture of the beer.

The installation also includes stations 6 providing the services or products necessary for manufacture. Thus each station 6 disclosed has a particular task to perform.

However, during the operation of the cellar, it is necessary to connect the stations 6 supplying the services or use functions to different recipients 1, either simultaneously or successively. This function is ensured by a group of automatic tapping devices 7 and 8, grouped according to two bridging tables 9 and 10 located at predetermined places in the installation.

To permit the passage of fluids in both directions between the stations 6 and the recipients 1, it is necessary to connect each recipient 1 to an automatic tapping device 7 of the bridging table 9, and to connect each station 6 to an automatic tapping device 8 of the bridging table 10. Moreover, each automatic tapping device 7 of the bridging table 9 must be connected to an automatic tapping device 8 of the bridging table 10.

Thus each recipient 1 can be connected to one or two stations 6 supplying a service function, such as arrival of the washing fluid, and/or a true use function of the recipient 1 such as, for instance, filling the recipient with beer. In the most general form of carrying out the invention, as represented in FIG. 1, one and the same function coming from station 6 must be arranged to be distributed simultaneously to several recipients 1. Moreover, one and the same recipient 1 must be able to receive simultaneously, by means of the pipe 4, a function of service coming from a station 6, and by means of the pipe 5, a function of use coming from another station 6.

These requirements call, in certain cases, for a particular configuration of the tapping devices 7 and 8 and the bridging tables 9 and 10, as represented in FIG. 1. The structure of these particular automatic tapping devices 7 and 8 will be clearly understood by reference to FIGS. 2, 3, 4 and 5.

In their general working principle, these automatic tapping devices 7 and 8 according to the invention comprise positioning means 11 and 12 of the extremities 13, 14, 15, 16, 17, 18 and 19 of the different respective pipes 20, 4, 5, 21,20, 22, 21.

Figure 5:
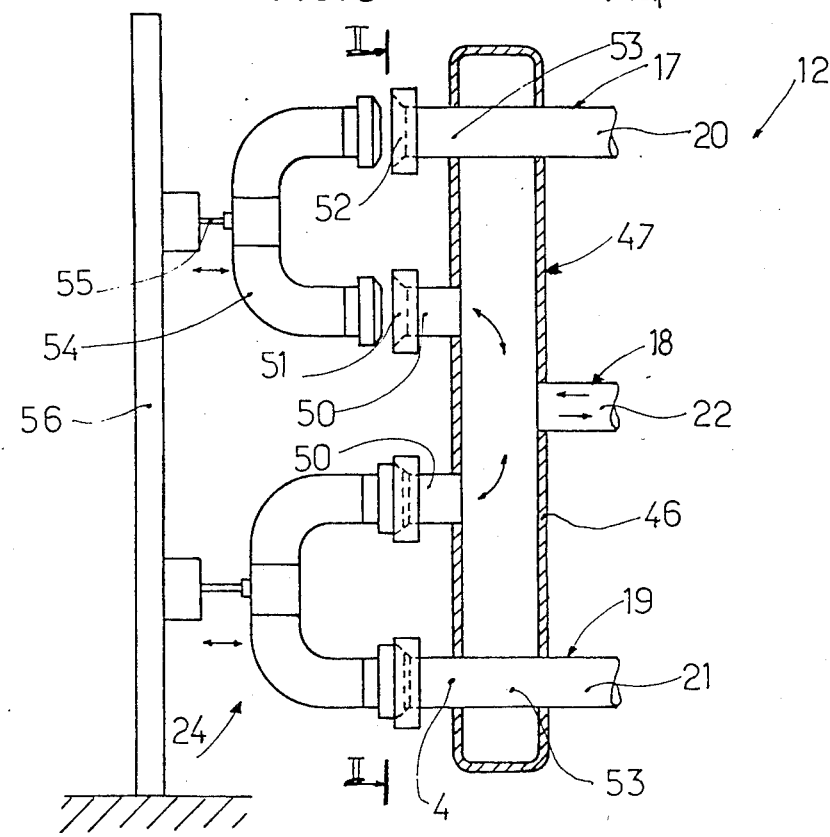
FIG. 5 is a plane view partially in section of another mode of carrying out an automatic tapping device according to the invention.

The automatic tapping devices 7 and 8 represented in FIGS. 4 and 5, also comprise automatic connection means respectively 23 and 24 allowing the two by two connection of the orifices belonging to the different pipes.

More precisely, the automatic tapping device 7, as disclosed in FIG. 4, allows the connection, on the one hand, of extremity 13 of a pipe 20 to extremity 14 of a pipe 4 and, on the other hand, extremity 15 of a pipe 5 to extremity 16 of a pipe 21.

For this purpose, the automatic tapping device 7 is composed principally of a support 25 provided with a predetermined number of holes 26 constituting the means of positioning 11 of the extremities 13, 14, 15, 16 of the different pipes 20, 4, 5 and 21.

The extremities 13, 14, 15 and 16 are held and immobilized in the above-mentioned holes 26 and positioned in the same vertical plane. According to the invention, the holes 26 are disposed in two semicircles surround two central holes 28 and 29, so that the holes arranged in the first semicircle can receive the extremities of the pipes 4 of the services and the holes arranged in the second semicircle can receive the extremities of the pipes 5 ensuring the transit of the use functions of the recipients 1. In this manner, the holes arranged in the first semicircle are all equidistant from hole 28, whereas the holes on the second semicircle are all equidistant from hole 29. As a consequence, it is easy to connect the different peripheral holes to the central hole by the corresponding connecting element.

As a result, in the version described in FIG. 4, the connection means 23 are constituted of two connecting elements 30 and 31 in a "U" shape, intended to connect the extremities 13 and 14 respectively on the one hand, and the extremities 15 and 16 on the other hand. For this purpose, each of the branches $30_1$ and $30_2$ of the connecting element 30 is provided at its extremity with a valve 32 and 33 respectively. In the same manner, each of the branches $31_1$ and $31_2$ of the connecting element 31 is provided, at its extremity, with a valve 34 and 35 respectively.

As a result of this arrangement, when the connecting elements 30 and 31 are positioned in the orifices $13_1$, $14_1$, $15_1$ and $16_1$ corresponding to the extremities 13, 14, 15 and 16 as represented in FIG. 4, a connection between a pipe 20 and 4 on the one hand is made and between a pipe 5 and 21 on the other hand, so as to permit the circulation of the fluid.

However, to ensure the automatic tapping between the pipe 4 and one of the pipes 20 and between the pipe 5 and one of the pipes 21, it is necessary to impart to the connecting elements 30 and 31 a rotary movement around an axis of rotation 36 and 37 respectively, combined with a movement of translation parallel to the pipes 20, 4, 5 and 21. The purpose of this is to present the valve 32 successively before one of the orifices $13_1$ of the pipes 20, and the valve 33 always facing the orifice $14_1$. Similarly, the valve 34 remains always facing the orifice $15_1$ while the valve 35 is presented successively before one of the orifices $16_1$ during the movement of the connecting element 31.

In order to provide for the guiding and driving of the connecting elements 30 and 31 to permit their movement and their tapping, the automatic tapping device 7 comprises drives 38 automatically activating the connecting elements 30 and 31 according to the tappings to be made. In the version described in FIG. 4, these drives 38 are constituted, on the one hand, of a sealing jack 39 activating the connecting elements 30 and 31 according to a translation parallel to the different pipes 20, 4, 5, 21 via a guiding element 40 and on the other hand, by two positioning jacks 41 and 42 allowing the connecting elements 30 and 31 to be rotated around their respective axis of rotation 36 and 37.

In order for the automatic tapping device 7 to to function, the different jacks 39, 41 and 42 are integral with a support 43 which provides support for them via connecting parts 44 and 45.

The device is also provided with conventional means of marking, not shown, allowing the position of the connecting elements 30 and 31 to be brought under control.

Thus, during the working of an automatic tapping device 7 located on the bridging table 9, it is easy to establish a double connection (pipes 4, 5, 20, 21) between, on the one hand, a recipient 1 and on the other hand two automatic tapping devices 8 of the bridging table 10, themselves connected to station 6 as shown in FIG. 1.

When the installation according to the invention is in operation, it may be necessary to supply the same function coming from a station 6 to several recipients 1 simultaneously. This presupposes that the automatic tapping devices 8 of the bridging table 10 should also have a particular structure, such as that represented in FIGS. 3 and 5. Thus the automatic tapping device 8 is also provided with automatic connection means 24 comprised of connecting elements 54 in "U" shape allowing the orifices of the pipes to be connected two by two, and these orifices are distributed in a particular way on the positioning support 46, allowing the extremities 17, 18 and 19 of the pipes 20, 22 and 21 to be positioned.

For this purpose, the positioning support 46 is composed of a hollow body 47 provided with a hole 48 for connection to a station 6 via a pipe 22. This positioning support 46 is also provided with holes 49 arranged concentrically to hole 48 and permitting the connection with the different automatic tapping devices 7 via the pipes 20, 21.

Finally, the positioning support 46 is provided with holes 50 also arranged concentrically to hole 48 and provided with halves 51. These valves 51 are situated in the same vertical plane as the valve 52 fitted to the extremities 53 of the pipes 20, 21. Thus it is easy to connect the pipes in two by two positioned respectively in the holes 49 and 50, by a group of connecting elements 54 in "U" shape. Of course, the automatic tapping device 8 comprises as many connecting elements 54 as there are pairs of holes 49, 50.

According to the invention, these connecting elements 54 which in this case do not need to be activated in rotation, are simply moved in translation in parallel to the different pipes 20, 21 via jacks 55 in one piece with a support 56.

When the automatic tapping device 8 is in operation, a fluid coming from a station 6 arrives in the hollow body 47 via the pipe 22 and is then distributed to the different holes 50 before being transmitted in the pipes 20, 21 via different connecting elements 54.

Of course, when a connecting element 4 is not in a closed position, the corresponding valve 51 remains closed.

It is clear that the elements of the installation described above and represented in FIGS. 1, 2, 3, 4 and 5 allow each recipient 1 to be connected to two stations 6 via the bridging tables 9 and 10. Furthermore, each station 6 can be connected to several recipients 1 simultaneously.

Figure 6:
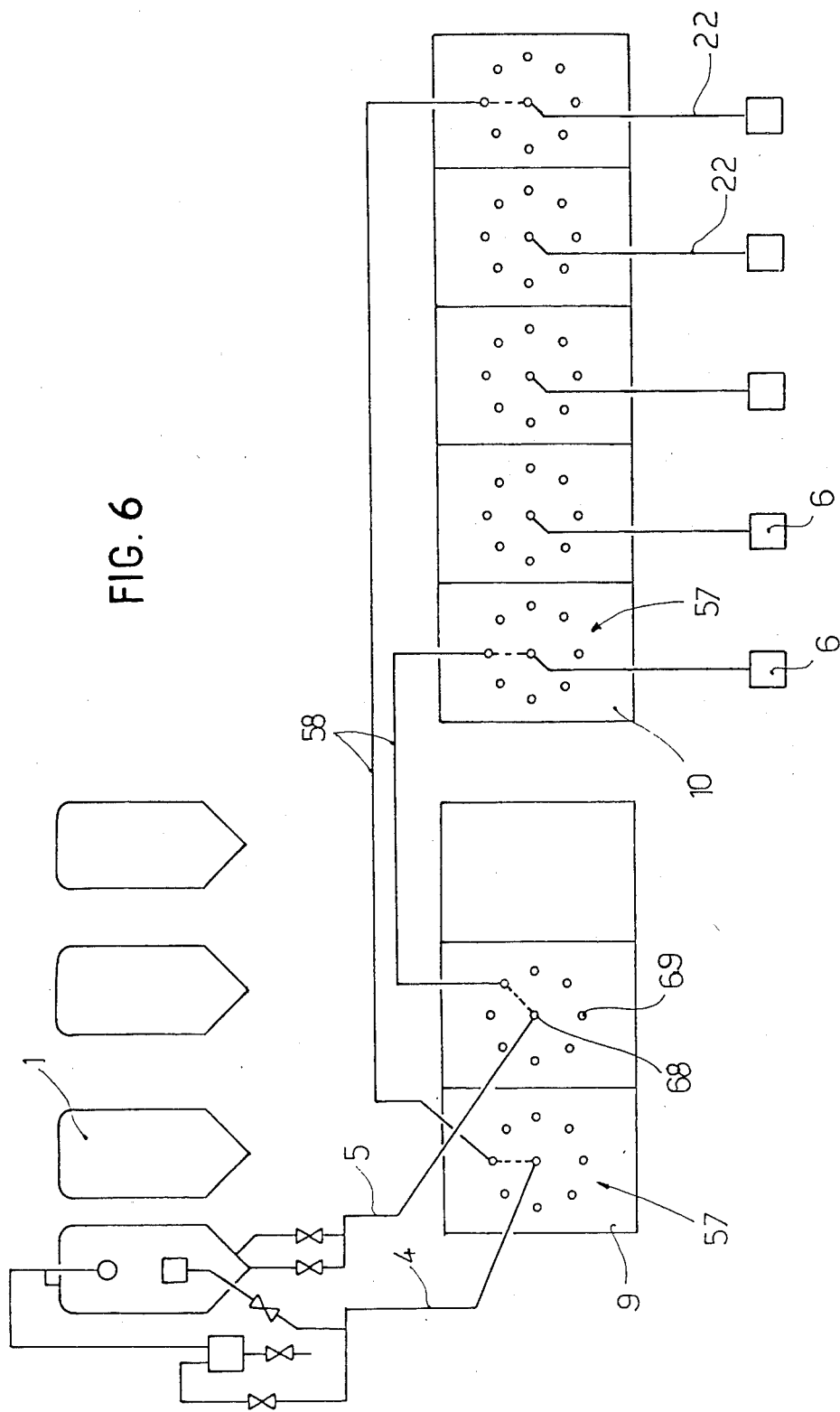
FIG. 6 is a schematic view of another mode of carrying out the installation using the device according to the invention.
Figure 7:
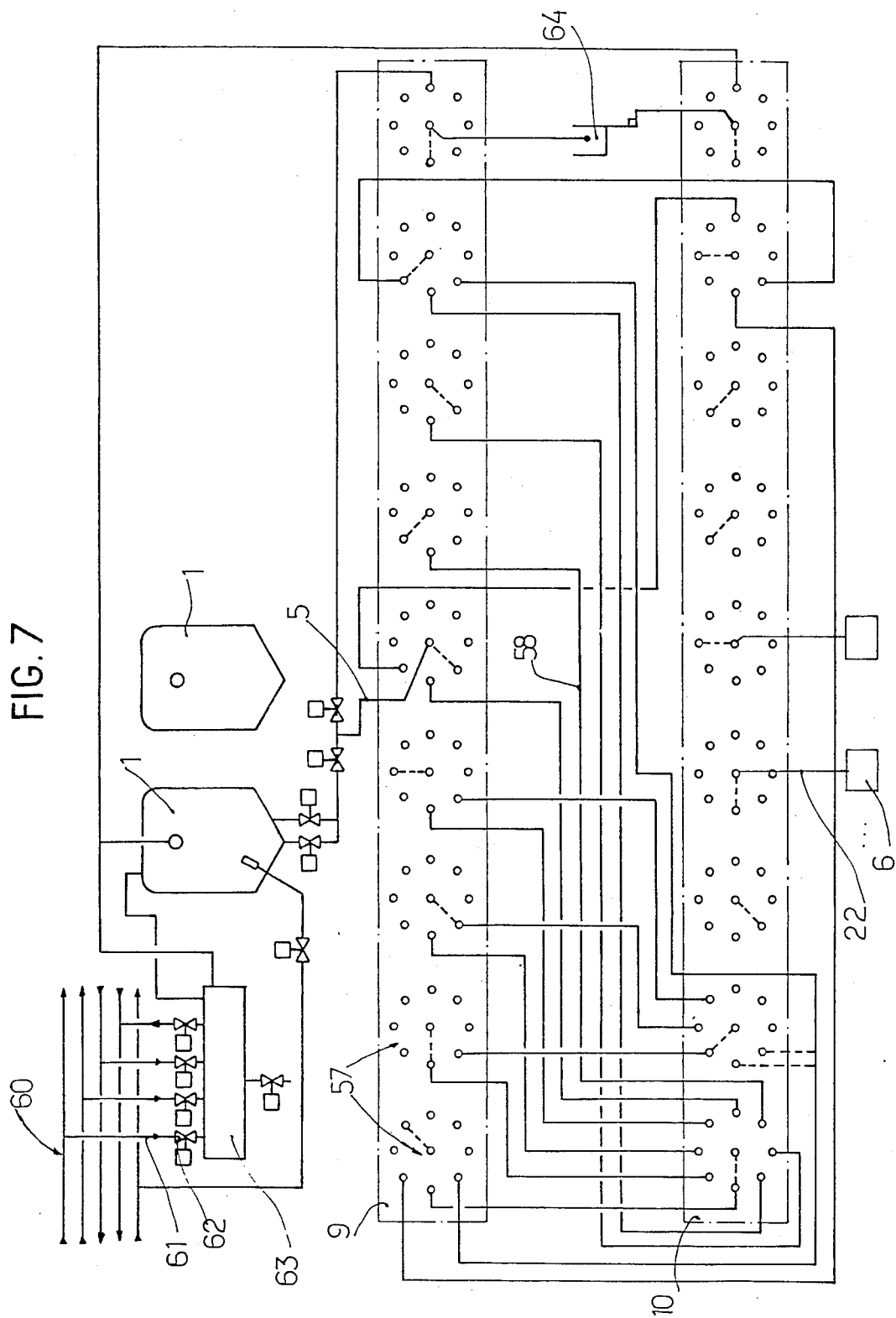
FIG. 7 is a schematic view of another mode of carrying out the installation using the device according to the invention.

In practice, and particularly during the manufacture of beer, it is not always necessary to provide for a maximum of simultaneous branchings, and this means that the installation can be considerably simplified as shown in FIGS. 6 and 7. This also permits the automatic tapping devices to be simplified, and in this case we can use tapping devices such as that shown in FIGS. 8 and 9.

As disclosed in FIG. 6, in the tapping mode, each recipient 1 always includes a pipe for services 4 and a pipe for functions 5 connected to a station 6 via the two bridging tables 9 and 10. In this case, however, the bridging tables 9 and 10 are comprised of automatic tapping devices 57 allowing only two pipes to be connected simultaneously. Because of this, a pipe for services 4 of the recipient 1 can be connected to a station 6 providing a service via, successively, an automatic tapping device 57 of the bridging table 9, a connecting pipe 58, then an automatic tapping device 57 of the bridging table 10, and finally another connecting pipe 22. Similarly, the functions pipe 5 of a recipient 1 is connected to another station 6 providing a function such as, for example, the emptying of yeast, via an automatic tapping device 57 of the bridging table 9, then a connecting pipe 58, an automatic tapping device 57 of the bridging table 10, and finally a connecting pipe 22.

Consequently, the branching of the installation according to FIG. 6 has the advantage of greater simplicity but is more suitable for brewery cellars in which it is useless to supply one and the same function coming from a station 6 to several user recipients 1 simultaneously.

In certain situations judged by a professional, it is possible to simplify the installation even more by adopting a configuration as shown in FIG. 7.

For this purpose, all the service functions are supplied to the different recipients 1 via a distribution battery of service fluids comprising a group of pipes 60. A direct broaching on these pipes 60 is made by means of pipes 61 fitted with valves 62 and ending in a paddle wheel 63 connected to the corresponding recipients 1.

In this manner, the service functions such as putting gases under pressure, recuperation of carbonic cases, exhausts of gases, etc. are derived from the pipes 60 and taken directly to each recipient 1 without using the joint infrastructure as described above.

It should also be noted that, by conforming to the tappings shown in FIG. 6, the bridging tables 9 and 10 group a set of automatic tapping devices 57 as described in more detail below.

Further, it should be noted that, similar to the the tapping disclosed in FIG. 6, each station 6 connected to an automatic tapping device 57 of the bridging table 10 can be connected at any given moment to only one automatic tapping device 57 of the bridging table 9 and subsequently to only one recipient 1.

So this method of tapping cannot assure the simultaneous arrival of several functions at a recipient 1, excepting those corresponding to service functions alone, excluding, however, the functions of washing and cleaning which call for the use of a pump 64.

Figure 8:
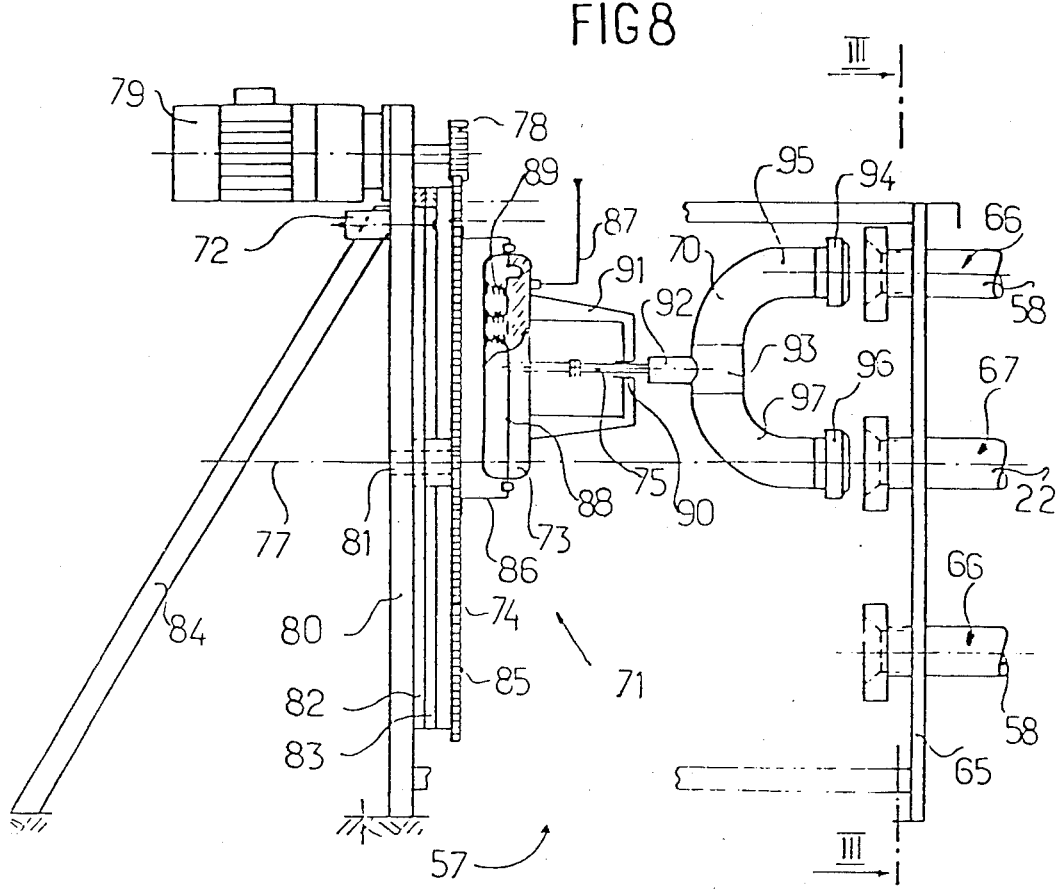
FIG. 8 is a view in elevation of another mode of carrying out an automatic tapping device such as those used on FIG. 7.
Figure 9:
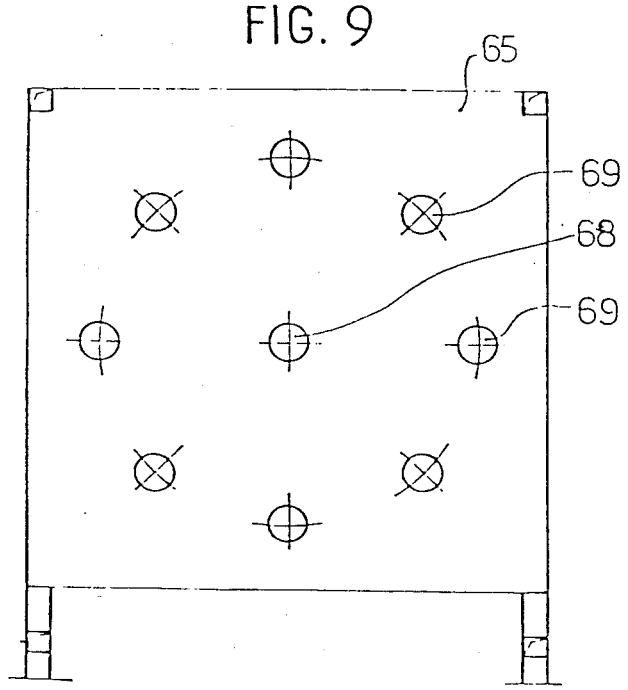
FIG. 9 is a view taken along a plane III—III of the automatic tapping device of FIG. 8.

We refer to FIGS. 8 and 9.

For implementing tappings such as those shown schematically in FIGS. 6 and 7, it is advantageous to have simplified automatic tapping devices 57 as shown in FIGS. 8 and 9.

Each automatic tapping device 57 used according to the connection procedure described above comprises, according to one of the characteristics of the invention, positioning means 65 of the extremities 66, 67 of the respective pipes 58 and 22.

These positioning means 65 are advantageously constituted by the support 65 in which the holes 68, 69 are made by allowing the extremities 67 and 66 of the pipes 22 and 58 to be positioned. According to the invention, the holes 69 are arranged in a concentric circle around the central hole 68. As a result, the extremities 66 of the pipes 58 can easily be connected successively to the extremity 67 of pipe 22 with the aid of the same connecting element.

For this purpose, this single connecting element is constituted by a connecting element 70 in "U" shape, similar to the connecting elements 30, 31 and 54 seen on FIGS. 4 and 5. However, in this latter case, this connecting element 70 is moved in translation and rotation by drives 71 cooperating with a position detector 72.

More precisely, the drives 71 are constituted on the one hand, by a jack 73 and on the other hand, by a toothed wheel 74 integral with the jack 73. This activates the connecting element 70 parallel translation to pipes 58 or 22 via a piston 75 in one piece with this connecting element 70, while the toothed wheel 74 is moved in rotation around an axis of rotation 77 via a pinion 78 driven by a conventional motor, in particular an electric motor 79.

For this purpose, the toothed wheel 74 is mounted on a support 80 by means of a boss 81. Also mounted on this boss 81 are a fixed bush 82 and a moving bush 83 cooperating with the position detector 72. This permits the angular position of the toothed wheel and, consequently, of the connecting element 70, to be brought under control.

The support 80 is maintained by the strengthening arm 84. The toothed wheel 74 comprises on its front surface 85 a hydraulic or pheumatic jack 73, fixed to the toothed wheel 74 by means of the fixing arm 86.

The jack 73 is activated by a control fluid arriving via a pipe 87 and altering the position of the valve 88, this valve 88 being returned to the initial position by springs 89 when the jack 73 is no longer activated. This jack 73 also comprises, in one piece with the valve 88, a piston 75 guided horizontally in a bearing 90 provided in a support 91 of any kind on one piece with the jack 73. The extremity 92 of the piston 75 is fixed by conventional means to the middle 93 of the connecting element 70.

Thus, during the operation of the automatic tapping device 57, the rotation of the toothed wheel 74 around the axis of rotation 77 has the effect of making the valve 94 fixed on the branch 95 of the connecting element 70 pass in front of the different holes 69, while the valve 96 fixed on the branch 97 of the connecting element 70 always remains facing a central hole 68.

According to the information given to a central command post (not shown) by the position detector 72, the toothed wheel 74 stops at a position such that the connecting element 70 has its valve 9 facing a hole 69, and the other valve 96 facing a hole 68.

Then the control of the jack 73 allows the connecting element 70 to be applied to the valves fitted on the extremities of pipes 58 and 22 positioned in these holes 68 and 69, or removed from them when the jack 73 is no longer activated.

In this way it is possible to carry out in a simple, reliable and automatic manner the connections between a pipe 58 or 59 (FIGS. 6 and 7) and a pipe 22 arriving at one of the bridging tables 9 or 10.

The automatic tapping devices described above have numerous advantages. In fact, the whole of the automatic tapping devices 7, 8 or 57, replacing several automatic valves, costs only about as much as one single automatic valve. Moreover, the distribution of the automatic tapping devices 7, 8 or 57 on two separate bridging tables 9 and 10, one being connected to the different recipients 1 and the other to the different stations 6 allows the absolute exclusion of interpenetration between two service or use functions coming from these stations 6, and also reduces the space taken up by all the branchings to be made.

Moreover, we are not confined to the modes of branching shown in FIGS. 1, 6 and 7 and it is easy to split the automatic tapping devices 7, 8 or 57 used on the same bridging table according to the needs of the cellar to be equipped.

Finally, if the dimensions of the pipes in the installation are changed, it is not necessary to replace a large number of valves. All that needs to be done is to replace the connecting elements 30,31, 54 or 70.

Although the description of the invention has referred to a particular layout, of course it is no means liited to this, and it is possible to make various modifications in the shapes, numbers and dimensions of these elements without departing from the context and the spirit of the invention.

I claim:

1. A tapping system for a liquid storing and treating installation, comprising;
    a plurality of recipients each adapted to contain a liquid therein;
    a plurality of bridging tables releasably connected to be in liquid communication with said plurality of recipients, each of said plurality of bridging tables comprising at least one automatic tapping device for handling the liquid contained in said plurality of recipients;
    a plurality of service stations releasably connected to be in liquid communication with said plurality of bridging tables such that the liquid contained in said plurality of recipients may be transported to said plurality of service stations through said bridging tables; and
    a positioning means;
    wherein said plurality of bridging tables are releasably connected to said plurality of recipients and said plurality of service stations by a plurality of liquid transport means, each of said plurality of liquid transport means comprising a connecting pipe having ends and extremities at the ends for connecting said recipients with said service stations through said bridging tables;
    wherein at least one of said automatic tapping devices comprises automatic connection means for connecting said liquid transport means with said positioning means, said positioning means cooperating with said automatic connection means, said automatic connection means comprising a plurality of U-shaped connecting elements, each of said U-shaped connecting elements including at least one valve located at each end thereof, at least one of said valves cooperating with at least one of said extremities;
    wherein said positioning means comprises a hollow uniplanar support member for handling liquid and having a hole located at the center thereof for connecting said at least one of said automatic tapping devices with one of said service stations, and a plurality of peripheral holes arranged in at least two concentric circles around said center hole for connecting said at least one of said automatic tapping devices with said recipients, wherein one of said extremities is held in one of said plurality of holes.

2. The tapping system of claim 1, wherein a first end of at least one of said U-shaped connecting elements is positioned to correspond to a hole in a first one of said concentric circles and the second end of said U-shaped connecting element is positioned to correspond to a hole in a second one of said concentric circles.

3. The tapping system of claim 2, wherein one end of one of said connecting pipes is held in said center hole and the other end thereof is connected to at least one of said plurality of service stations such that the liquid can flow from at least one of said recipients to said at least one of said service stations through said uniplanar hollow support member, at least one of said connecting elements and at least one of said connecting pipes.

4. The tapping system of claim 3, further comprising driving means for activating horizontal reciprocal translation of said connecting elements relative to said support member, said driving means comprising a plurality of jacks, at least one of said jacks cooperating with one of said connecting elements.

5. The tapping system of claim 4, wherein said horizontal reciprocal translation of one of said connecting elements causes a first end thereof to be positioned opposite to a hole in said first concentric circle and the second end thereof to be positioned opposite to a hole in said second concentric circle.

6. A tapping system for a liquid storing and treating installation, comprising;
   a plurality of recipients each adapted to contain a liquid therein;
   a plurality of bridging tables releasably connected to be in liquid communication with said plurality of recipients, wherein each of said plurality of bridging tables comprises at least one automatic tapping device for handling the liquid contained in said plurality of recipients;
   a plurality of service stations releasably connected to be in liquid communication with said plurality of bridging tables such that the liquid contained in said plurality of recipients may be transported to said plurality of service stations through said bridging tables; and
   a positioning means;
   wherein said plurality of bridging tables are releasably connected to said plurality of recipients and said plurality of service stations by a plurality of liquid transport means;
   wherein at least one of said automatic tapping devices comprises automatic connection means for connecting said liquid transport means with said positioning means, said positioning means cooperating with said automatic connection means, wherein said positioning means comprises a uniplanar support member having a plurality of holes arranged to form a first set of holes located at the center thereof and a second set of holes being located around the periphery, wherein said first set of holes comprises a first center hole for connecting said at least one of said automatic tapping devices with one of said service stations and a second center hole for connecting said at least one of said automatic tapping devices with another one of said stations, wherein said second set of holes is arranged to comprise holes arranged in a first semi-circle for connecting one of said recipients with said automatic at least one of said tapping devices and holes arranged in a second semi-circle for connecting another one of said recipients with said at least one of said automatic tapping devices;
   wherein said first center hole is equidistant from each of said holes arranged in said first semi-circle and said second center hole is equidistant from each of said holes arranged in said second semi-circle.

7. The tapping system of claim 6, wherein each of said plurality of liquid transport means comprises a connecting pipe having ends and extremities at said ends for connecting said recipients with said service stations through said bridging tables.

8. The tapping system of claim 7, wherein one of said extremities is held in one of said plurality of holes.

9. The tapping system of claim 8, wherein said automatic connection means comprises a plurality of U-shaped connecting elements, each of said connecting elements including at least one valve located at each end thereof, at least one of said valves cooperating with at least one of said extremities.

10. The tapping system of claim 9, wherein a first end of at least one of said U-shaped connecting elements is positioned to correspond to said first center hole to connect said connecting pipes with said recipients and the second end is positioned to correspond to one of said holes arranged in said first semi-circle to connect said connecting pipes with said service stations.

11. The tapping system of claim 10, wherein a first end of another one of said U-shaped connecting elements is positioned to correspond to said second center hole to connect said connecting pipes with said recipients and the second end of said another one of said U-shaped connecting elements is positioned to correspond to one of said holes arranged in said second semi-circle to connect said connecting pipes with said service stations.

12. The tapping system of claim 11, further comprising a guiding element and driving means for activating horizontal reciprocal translation of said connecting elements relative to said support member, said driving means comprising a sealing jack connected to said guiding element and a plurality of positioning jacks, said guiding elements cooperating with each of said connecting element, at least one of said positioning jacks being adapted to rotate at least one of said connecting elements about an axis of rotation thereof and another of said plurality of positioning jacks being adapted to rotate another of said connecting elements about an axis of rotation thereof to respectively position said ends of said U-shaped connecting elements to one of said center holes and said holes arranged in said first and second semi-circles.

13. The tapping system of claim 12, wherein a rotation of one of said connecting elements causes one end thereof to be positioned to correspond to one of said holes arranged in said first semi-circle while the other end thereof corresponds to said first center hole.

14. The tapping system of claim 12, wherein a rotation of one of said connecting elements causes one end thereof to be positioned to correspond to one of said holes arranged in said second semi-circle while the other end thereof corresponds to said second center hole.

15. A tapping system for a liquid storing and treating installation, comprising;
   a plurality of recipients each adapted to contain a liquid therein;
   a plurality of bridging tables releasably connected to be in liquid communication with said plurality of recipients, wherein each of said plurality of bridging tables comprises at least one automatic tapping device for handling the liquid contained in said plurality of recipients.
   a plurality of service stations releasably connected to be in liquid communication with said plurality of bridging tables such that the liquid container in said plurality of recipients may be transported to said plurality of service stations through said bridging tables, wherein said plurality of bridging tables are releasably connected to said plurality of recipients and said plurality of service stations by a plurality of liquid transport means; and
   a positioning means;
   wherein at least one of said automatic tapping devices comprises automatic connection means for connecting said liquid transport means with said positioning means, said positioning means cooperating with said automatic connection means, wherein said positioning means comprises a uniplanar support member having a center hole located at the center thereof for connecting said at least one of said automatic tapping devices with one of said service stations and a plurality of peripheral holes arranged in a concentric circle around said center hole for connecting said at least one of said automatic tapping devices with one of said recipients, said automatic connection means comprising at least one U-shaped connecting element, said connecting element including at least one valve located at each end thereof, said connecting element being rotationally movable whereby a rotational movement of said connecting element causes a first end thereof to be positioned opposite to said center hole and the second end thereof to be positioned opposite to a hole in said concentric circle;

wherein said tapping system further comprises activation means for activating said rotational movement of said connecting element, said activation means comprising a jack, and a toothed wheel, said jack being integral with said toothed wheel, said jack including a piston cooperating with said connecting element an electric motor connected to the toothed wheel, said toothed wheel being adapted to be rotated by said electric motor.

16. The tapping system of claim 15, wherein each of said plurality of liquid transport means comprises a connecting pipe having extremities for connecting said recipients with said service stations through said bridging tables.

17. The tapping system of claim 16, wherein one of said extremities is held in one of said plurality of holes.

18. A tapping system for a liquid storing and treating installation, comprising;
- a plurality of recipients each adapted to contain a liquid therein;
- a plurality of bridging tables releasably connected to be in liquid communication with said plurality of recipients, wherein each of said plurality of bridging tables comprises at least one automatic tapping device for handling the liquid contained in said plurality of recipients;
- a plurality of service stations releasably connected to be in liquid communication with said plurality of bridging tables such that the liquid contained in said plurality of recipients may be transported to said plurality of service stations through said bridging tables, wherein said plurality of bridging tables are releasably connected to said plurality of recipients and said plurality of service stations by a plurality of liquid transport means; and
- a positioning means;
- wherein at least one of said automatic tapping devices comprises automatic connection means for connecting said liquid transport means with said positioning means, said positioning means cooperating with said automatic connection means, wherein said positioning means comprises a uniplanar support member having a center hole located at the center thereof for connecting said at least one of said automatic tapping devices with one of said service stations and a plurality of peripheral holes arranged in a concentric circle around said center hole for connecting said automatic tapping device with one of said recipients, said automatic connection means comprising at least one U-shaped connecting element, said connecting element including at least one valve located at each end thereof, said connecting element being rotationally movable, whereby a rotational movement of said connecting element causes a first end thereof to be positioned opposite to said center hole and the second end thereof to be positioned opposite to a hole in said concentric circle;
- wherein said tapping means further comprises a support, an angularly positionable toothed wheel mounted on said support, a pin-shaped member fixedly engaging the toothed wheel on said support, a position detector, a fixed bush and a movable bush mounted on said pin-shaped member, said movable bush cooperating with said position detector for controlling the angular position of said toothed wheel and of said connecting element.

* * * * *

UNITED STATES PATENT AND TRADEMARK OFFICE
CERTIFICATE OF CORRECTION

PATENT NO. : 4,730,651

DATED : March 15, 1988

INVENTOR(S) : Pierre MILLET

It is certified that error appears in the above-identified patent and that said Letters Patent is hereby corrected as shown below:

At column 1, line 39, insert ---the valve is not sufficient tight, this technique has--- after "Moreover, if".

At column 1, line 49, change "soon as" to ---the---.

At column 3, line 60, insert ---,--- after "semicircles".

At column 4, line 48, delete "to" after "to".

At column 5, line 37, change "4" to ---54---.

At column 6, line 66, insert ---in a--- after "70".

At column 7, line 13, change "pheumatic" to ---pneumatic---.

At column 7, line 35, change "9" to ---94---.

At column 8, line 1, change "liited" to ---limited---.

Signed and Sealed this

Third Day of January, 1989

Attest:

DONALD J. QUIGG

Attesting Officer

Commissioner of Patents and Trademarks